April 8, 1952 B. TREVOR 2,592,493

PULSE COUNTER CIRCUIT

Filed Aug. 22, 1945 2 SHEETS—SHEET 1

INVENTOR
BERTRAM TREVOR
BY [signature]
ATTORNEY

April 8, 1952 B. TREVOR 2,592,493

PULSE COUNTER CIRCUIT

Filed Aug. 22, 1945 2 SHEETS—SHEET 2

INVENTOR
BERTRAM TREVOR
BY H. G. Grover
ATTORNEY

Patented Apr. 8, 1952 2,592,493

UNITED STATES PATENT OFFICE 2,592,493

PULSE COUNTER CIRCUIT

Bertram Trevor, Riverhead, N. Y., assignor to Radio Corporation of America, a corporation of Delaware Application August 22, 1945, Serial No. 612,034

15 Claims. (Cl. 250—27)

This invention relates to an electrical counter circuit for counting pulses.

An object of the invention is to provide an improved circuit for generating a step wave voltage having a plurality of steps or risers corresponding in number to a desired number of applied input waves.

Another object of the invention is to provide a stable counter circuit for generating a pulse which is a submultiple of the frequency of an applied alternating current wave.

A further object is to provide an electrical counter circuit which generates an output wave of a frequency which is lower than but a function of a higher frequency input wave.

A still further object is to provide an electrical pulse counter circuit which can count pulses up to fifteen with greater stability than prior counters.

Still a further object is to provide a stable pulse counter circuit capable of counting small voltage pulses of the order of 15 volts, and able to furnish a step wave voltage having an amplitude of about 150 volts.

The counter circuit of the invention has numerous applications in electrical circuits. By way of illustration the invention may be used in a pulse type multiplex communication system for producing a step wave voltage and also to produce an output pulse which has a submultiple frequency relation to an input wave; or the counter of the invention may be used as a frequency divider of applied input waves whether these applied input waves are of square wave or pulse wave character. When used in a pulse type multiplex system, the different steps or risers in the step wave voltage may control different channel selector circuits.

A more detailed description of the invention follows in conjunction with the drawing, wherein.

Figure 1:
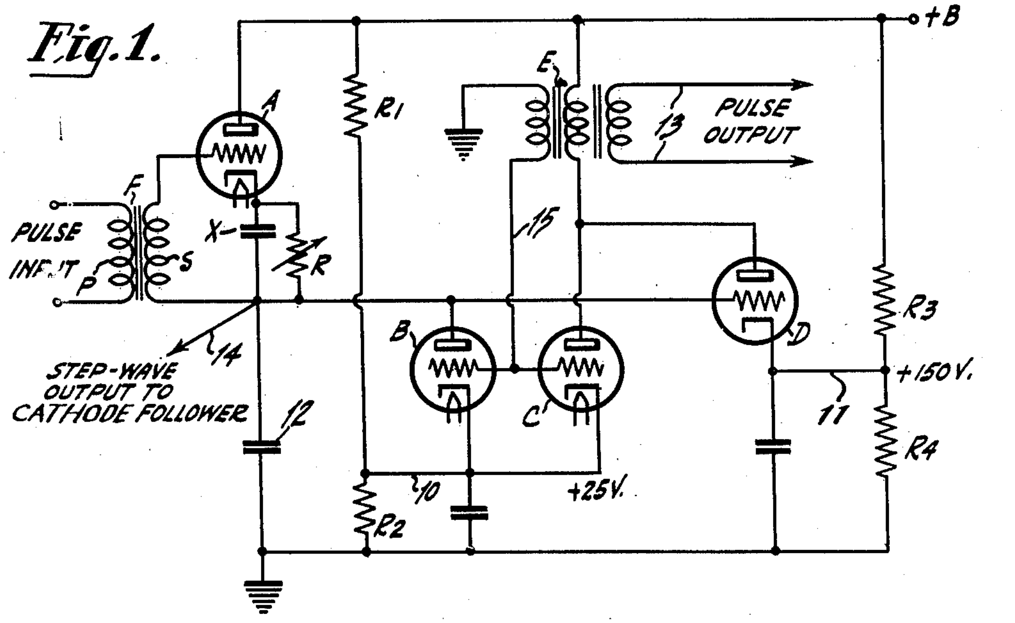
Fig. 1 illustrates one embodiment of the counter circuit of the invention.

The pulse counter circuit of Fig. 1 includes an input transformer F, four triode vacuum tubes A, B, C and D, and assorted circuit elements. Output is taken from one winding of a three winding pulse transformer E.

Tube A is normally biased to cut-off by resistor R in the cathode circuit with its associated bypass condenser X. The time constant of R and X of the resistor-condenser circuit in the cathode of tube A is large in comparison with the average interval between adjacent input pulses applied to the primary winding of transformer F. The grid of tube A is connected to one terminal of secondary winding S, while the cathode is connected to the other terminal of winding S. A storage or step condenser 12 is connected between ground and the parallel combination X, R in the cathode circuit of tube A.

The four vacuum tubes A, B, C and D are normally non-conductive; that is, they are biased to the anode current cut-off condition. The cathodes of tubes B and C are connected together and maintained at a small value of positive direct current potential (about +25 volts) by means of a connection 10 extending to a bleeder circuit comprising a pair of resistors R1 and R2, in turn connected between ground and a source of positive direct current potential +B, for example, +300 volts. The grids of tubes B and C are directly connected together and to one outer winding of transformer E.

Tube D acts as a clipper and has its cathode maintained at a value of positive direct current potential corresponding approximately to the amplitude of the step wave voltage to be developed. The cathode of tube D is connected by lead 11 to the junction point of resistors R3 and R4 comprising a bleeder circuit connected from +B to ground, as shown. Lead 11 may, for example, maintain the cathode of tube D at +150 volts. The grid of tube D is connected to the anode of tube B and to one plate of storage or step condenser 12. The anodes of tubes C and D are connected together and to +B through the center winding of transformer E.

A description of the operation of the electrical pulse counter circuit of Fig. 1 will now be given. The windings of transformer F are so poled that each time a pulse is applied to the primary winding P a pulse of positive voltage will be applied to the grid of tube A via the secondary winding S. This pulse of positive voltage applied to the grid of tube A is of sufficient magnitude to cause tube A to conduct for the duration of the applied pulses. When tube A conducts, an incremental positive charge is built up on condenser 12. This charge on condenser 12 cannot leak off. After several charges are built up on step or storage condenser 12, due to a corresponding number of input pulses applied to tube A, the resultant positive voltage stored on condenser 12 will be sufficient to overcome the bias on the clipper tube D and cause this clipper tube to conduct. Clipper tube D is biased positively to approximately the value to which the charge on the step condenser 12 must reach before this bias on tube D is overcome. Thus, if +150 volts is applied to the cathode of tube D by the bleeder circuit R3, R4 and lead 11, then the step wave built up on condenser 12 must reach an amplitude of approximately 150 volts before tube D will conduct.

Figure 2:
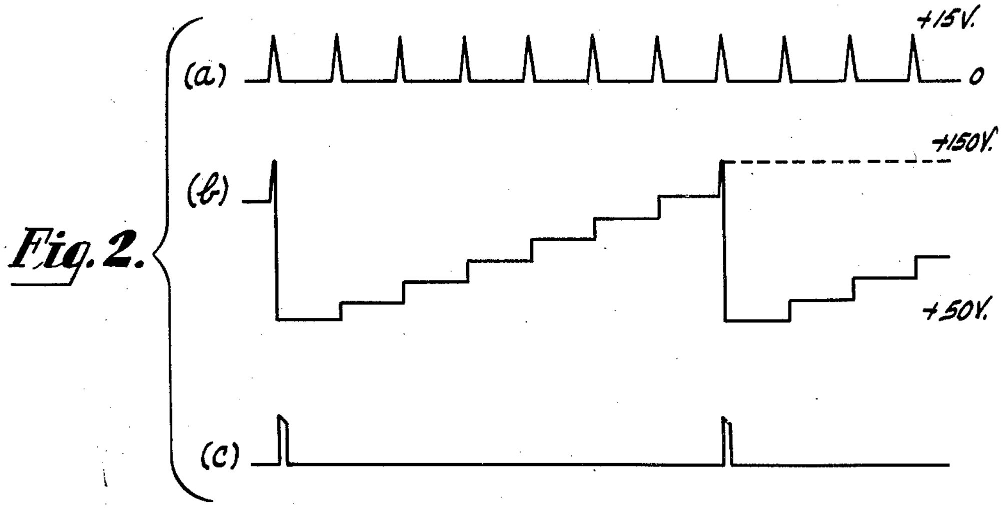
Fig. 2 shows a series of curves, *a*, *b* and *c* representing voltage variations at various designated points in the circuit of Fig. 1.

Curve *b* of Fig. 2 illustrates the incremental increases in charge on condenser 12 during one cycle of operation. Each step or rise in the step wave or stair of curve *b* indicates an incremental charge of voltage on condenser 12 for each applied input pulse causing tube A to conduct. It should be noted that the step wave built up on condenser 12 covers a range from +50 volts to 150 volts, and that there are seven steps or risers each of which is about 14 volts.

The building up of a charge on the condenser 12 on the last rise to a value (about +150 volts) sufficient to overcome the cathode bias on tube D will cause this tube to start conducting very suddenly, as a result of which a pulse of current is passed through the center winding of pulse transformer E. The windings of pulse transformer E are so poled that a sharp positive pulse is fed back to the grid of tube C over lead 15, thus causing tube C to conduct suddenly. Tube C and transformer E constitute, in effect, a one shot tripping oscillator. Putting it in other words, tube C is arranged to be an over-biased pulse oscillator and is connected regeneratively to produce only one pulse in response to the flow of current in tube D, after which tube C ceases conducting.

The same positive pulse which is applied via lead 15 to the grid of tube C is also applied to the grid of tube B and is of sufficient magnitude to cause tube B to conduct. When tube B conducts, it provides a low impedance path across step condenser 12 and discharges condenser 12 to about 50 volts. The reason the step condenser 12 is not discharged below approximately 50 volts is because the cathode of discharge tube B is supplied with +25 volts via lead 10, and further there is a voltage drop of approximately 25 volts in tube B.

There are two outputs obtainable from the counter circuit of Fig. 1. One output is taken from leads 13 in circuit with one winding of transformer E and this output comprises a pulse whose frequency is a sub-multiple of the applied input waves. The other output is taken from lead 14 and comprises a step wave voltage having a desired number of steps or risers corresponding to a similar number of applied input waves.

Curve *a* of Fig. 2 illustrates, by way of example, a series of recurring input waves which are applied to the grid of tube A. The positive pulses of curve *a* are of relatively low amplitude, approximately 15 volts peak. Curve *b* of Fig. 2 illustrates the appearance of the step wave voltage output obtainable from lead 14. Although there are only seven steps or risers shown in curve *b* of Fig. 2, it should be understood that the counter of the invention can count a smaller or larger number of input waves with good stability, depending upon the values of step condenser 12 and bias resistor R. The amount of voltage per step or riser in curve *b* is controlled by resistor R in the cathode circuit of tube A. For example, a greater value of resistance for R will cause less current to pass through tube A and less voltage to be obtained per step; hence producing a higher count in the step wave voltage before the maximum amplitude is reached which will cause the clipper tube D to conduct. Correspondingly, a smaller value of resistance for R will cause more current to flow through tube A and more voltage to be obtained per step (more charge on 12 per step), and hence a smaller count before the clipper tube D conducts. By the same token, a larger value for the step condenser 12 will give less rise per step, everything else being the same.

Curve *c* of Fig. 2 indicates the appearance of the output taken from leads 13. It should be noted that this output is a sub-multiple of the applied input waves.

The system of Fig. 1 has been found to give excellent stability in counting pulses up to fifteen. It should be noted that the various functions of the clipper tube, tripping oscillator, and discharge tube are isolated from each other and that the discharge of condenser 12 is accomplished with the plate current of tube B. This results is an advantage over prior circuits which utilize the grid current of a tube to discharge a condenser in a counter circuit. Moreover, the counter of the invention furnishes a more linear step wave; that is, a step wave voltage wherein each rise is more nearly of the same amplitude compared to preceding and succeeding risers than previous counters.

Figure 3:
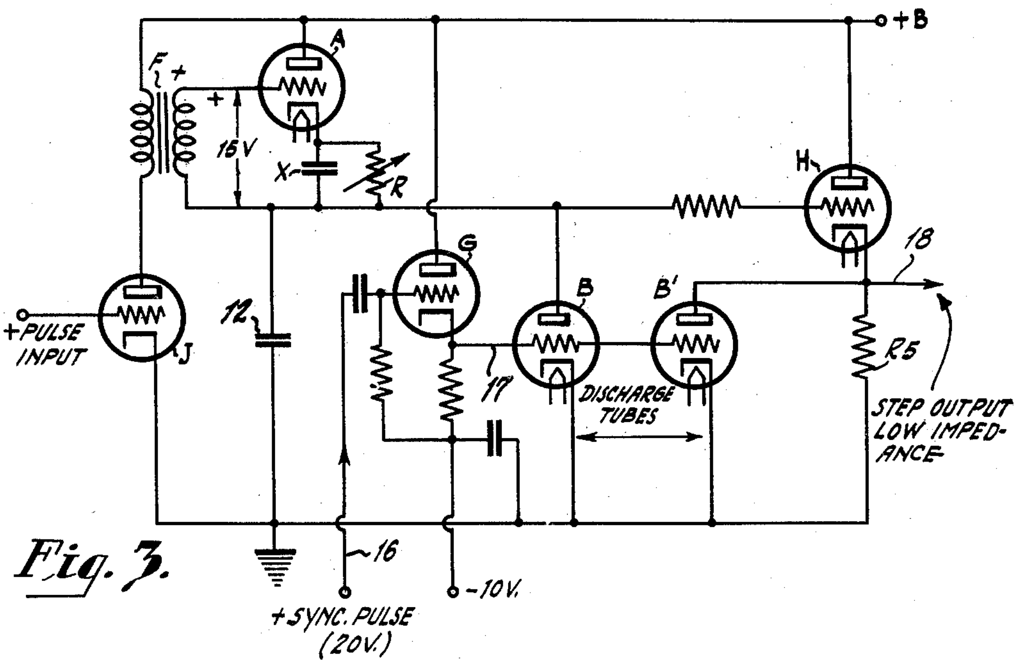
Figs. 3 and 4 illustrate other electrical circuit embodiments of the invention.

Fig. 3 shows an electrical counter circuit especially adapted for use at the receiving terminal of a pulse multiplex system. In such a system, it is customary to transmit short pulses of radio frequency energy at constant amplitude and at a fixed average repetition rate. The pulses in the different channels are transmitted consecutively and have their occurrence time or phase modulated within predetermined limits. During each cycle of operation or synchronizing period, there are transmitted pulses from all of the channels followed by a synchronizing pulse of longer duration than the channel pulses. This cycle of operation repeats itself continuously at the synchronization period. One such pulse multiplex system is described in copending application Serial No. 608,957, filed by William D. Houghton on August 4, 1945, now Patent No. 2,531,817, issued November 28, 1950.

At the receiving terminal of such a pulse multiplex system, it becomes necessary to selectively control the channel apparatus (selectors) at the proper phase relative to the incoming pulses. Fig. 3 illustrates a stable electrical counter or step wave generator for producing a step wave voltage from applied pulses and whose individual risers, by virtue of their different amplitudes, can be used to control different channel selectors.

Those parts of Fig. 3 which are equivalent to similar parts of Fig. 1 have been given the same reference characters. Thus, transformer F, condenser 12 and triode vacuum tube A are similar to the same parts of Fig. 1.

Input pulses of positive polarity (direct current) from a suitable source of constant repetition rate of the same frequency as the channel pulses are applied to amplifier J and thence to normally non-conductive triode A via transformer F. Tube J may or may not be always conductive, depending upon the particular circumstances. It is not important whether this tube is or is not conductive; the important consideration being that pulses appear at the secondary of transformer F. The pulses applied to the grid of tube A have approximately a 15 volt amplitude. Tube A conducts each time a pulse is applied thereto and causes increments of positive voltage to be built up on step or storage condenser 12.

The synchronization pulse which occurs during each cycle of operation, and after the channel pulses, is applied via lead 16 to the grid of normally non-conductive triode vacuum tube G and is of such magnitude and polarity as to cause tube G to conduct. As an illustration, this synchronizing pulse may have a value of +20 volts.

A cathode follower in the form of a vacuum tube H has its grid connected to one plate of step condenser 12. This tube is also provided with a cathode resistor R5 across which the output step wave voltage is developed.

Vacuum tubes B and B′ are discharge tubes and are normally non-conducting; that is, biased to cut-off. The grids and cathodes of these two tubes are respectively connected together. The grids of these tubes are connected to the cathode of tube G by means of lead 17. Tube B serves to discharge condenser 12 when this tube conducts. Tube B′ is made to conduct at the same time as tube B, and provides a low impedance path across the resistor R5 in the cathode circuit of cathode follower tube H.

When tube G suddenly conducts in response to a synchronizing pulse of positive polarity on its grid, it supplies a positive pulse to the grids of tubes B and B′ via lead 17 of such magnitude as to cause tubes B and B′ to conduct. When tube B conducts, it provides a low impedance path across the step condenser 12 and discharges this condenser.

When tube B′ conducts, it provides a low impedance path across the resistor R5 and causes a faster discharge of the complete step wave in the presence of a capacity load on output lead 18. Stated in other words, tube B′ prevents the occurrence of a gradual trailing edge to the output step wave.

Tube H is a cathode follower and is always conductive. The output wave derived from its cathode by lead 18 is a duplicate of the wave supplied to its grid by the step condenser. The voltage waveform of this output wave is shown in curve *b* of Fig. 2, assuming only six channel pulses plus a synchronizing pulse per synchronizing period. Of course, if a greater or lesser number of channels are employed, the counter will be adjusted to produce a corresponding number of risers or steps in the output voltage wave form by suitable selection or adjustment of the values of resistor R and condenser 12.

Figure 4:
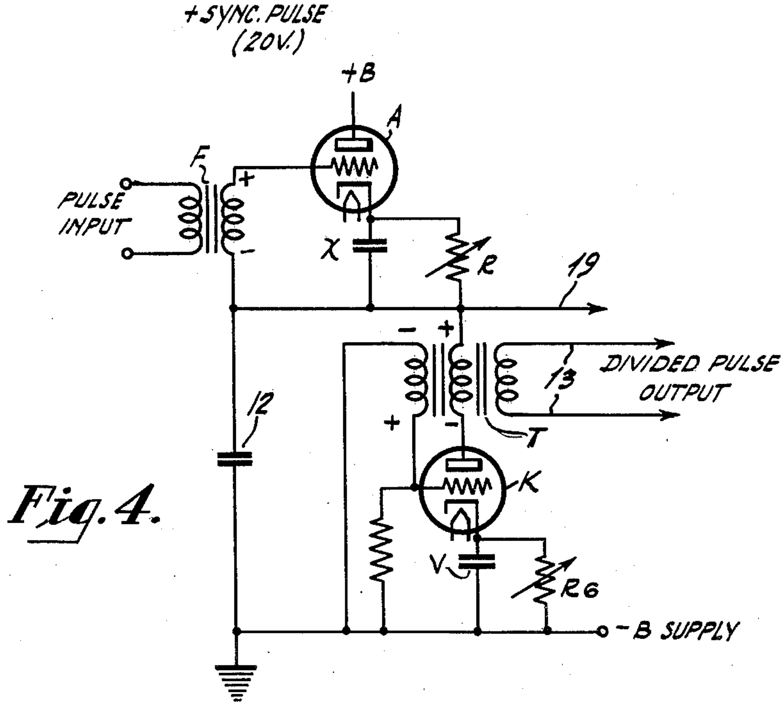

Fig. 4 is another embodiment of a pulse counter circuit which is very stable under changes of supply voltages. The circuit of Fig. 4 comprises a pulse transformer F to which input pulses are applied, a triode vacuum tube A coupled to transformer F and which is biased to be normally non-conductive by the parallel resistor-condenser combination RX, and a regenerative pulse oscillator comprising a normally non-conductive vacuum tube K and transformer T.

The pulse input to transformer F is so adjusted and the windings of this transformer so poled that the pulses impressed on the grid of tube A are short compared to the time intervals between them, of positive polarity, and of a magnitude in the range of +15 to +20 volts. Tube A conducts only for the duration of each applied pulse due to the fixed bias developed by RX. The time constant of resistor R and condenser X is such as to be large compared to the average interval between applied pulses.

Each time tube A conducts, an increment of positive voltage is built up on step condenser 12 which is in circuit with the cathode of tube A. There is thus built up on condenser 12 a step wave voltage composed of a plurality of increasing voltage steps or risers corresponding in number to the number of applied pulses before the condenser 12 is discharged.

Transformer T has three windings, the center one of which is in series within the anode of tube K. Another winding of transformer T is regeneratively coupled back to the grid of tube K to supply this grid with a positive impulse whenever tube K is caused to conduct. The parallel resistor-condenser combination R6, V in the cathode circuit of tube K develops a self bias for tube K and is designed to provide a long time constant in comparison with the time interval between discharges of the step wave. Tube K conducts suddenly when the step wave voltage built up on step condenser 12 is of the desired overall step wave amplitude to be developed. In effect, tube K and transformer T comprise an over-biased regenerative pulse or tripping oscillator which produces only one pulse for each step wave voltage; sometimes known as a one shot oscillator. When tube K conducts, it provides a low impedance path across step condenser 12 and causes this condenser to discharge suddenly to a low voltage value.

The variable resistors R and R6 in the cathode circuits of tubes A and K respectively, enable adjustments of the height (amplitude) of the step wave voltage and also of the count (frequency division).

Two outputs are obtainable from Fig. 4. One output is taken from lead 19 and comprises a step wave voltage having a desired number of steps or risers corresponding to the number of input pulses to be counted. The other output is taken from a winding of transformer T via leads 13 and comprises a pulse whose frequency is a submultiple of the applied input pulses. The appearance of these two outputs is shown in curves *b* and *c* of Fig. 2, respectively.

If a more nearly sine wave output is desired, a cathode follower stage may be coupled to lead 19. This output may be put through a low pass filter to remove harmonics.

The system of Fig. 4 is very stable in operation, and this is believed to be due to the self-regulating bias developed by circuit elements R6 and V of tube K. A higher voltage of step provides more current in R6, thus more bias, and hence the critical discharge voltage of tube K is higher and the count is maintained. The system is not critical to filament voltage changes.

The advantages of the pulse counter of Fig. 4 are: (1) A very linear step wave is obtainable, that is, each rise or step is of nearly the same amplitude as the preceding and succeeding one; (2) the count is very stable. In one embodiment tried out in practice, a count of 17 was maintained while varying the alternating current line voltage from 100 to 130 volts using A.-C. power supply apparatus. This variation of voltage is equivalent to varying +B and filament voltages over a range ±14%; (3) the system is extremely simple since it may utilize only one double triode (tubes A and B in one evacuated envelope) and two pulse transformers; (4) either a pulse output or a step wave output or both can be obtained. The step wave output is easily changed to a sine wave by means of RC filters; (5) it does not require high voltage pulses for operation; and (6) a pair of such counters can be used, one driving the other, without the need of extra coupling tubes, transformers, etc.

The term "ground" used in this description and appended claims is not limited to an actual earthed connection but is deemed to include any point or surface of zero potential for direct current or alternating current.

What is claimed is:

1. A pulse counting system comprising a vacuum tube having grid, anode and cathode electrodes, a source of anode polarizing potential connected to said anode, means for normally biasing said tube to the anode current cut-off condition, an input circuit coupled to said grid and cathode for supplying short duration pulses of such polarity and magnitude as to cause said tube to conduct for the duration of each applied pulse, said means including a resistance-parallel connected condenser in the cathode circuit of said tube, said resistance-condenser arrangement having a time constant which is large in comparison with the average interval between adjacent input pulses, a charge collecting condenser connected between ground and said resistance-condenser arrangement, whereby an incremental increase in voltage of positive polarity is built up on said charge collecting condenser for each input pulse during a cycle of operation, means responsive to a predetermined voltage built up on said charge collecting condenser from a plurality of incremental increases caused by a plurality of applied input pulses for discharging said condenser, and means connected to said cathode and said charge collecting condenser for deriving from said condenser a step wave voltage having a plurality of risers or steps of substantially equal amplitude corresponding in number to the number of input pulses to be counted.

2. A pulse counting system comprising a vacuum tube having grid, anode and cathode electrodes, a pulse transformer having a primary winding coupled to a source of recurring pulses of short duration compared to the time intervals between them and of substantially constant frequency, a connection from one terminal of the secondary winding of said pulse transformer to said grid, a connection including the parallel combination of a resistor and a condenser connecting the other terminal of said secondary winding and said cathode, said parallel combination having a long time constant in comparison to the interval between said pulses and providing a fixed bias which normally causes said tube to be non-conductive, the pulses applied to said grid being of positive polarity and having sufficient magnitude to cause said tube to conduct for substantially the duration of each pulse, and a storage condenser connecting said last terminal of said secondary winding to ground, whereby an incremental increase in voltage is developed across said storage condenser for each recurring input pulse during a cycle of operation of said system, and an output circuit coupled to said storage condenser for deriving therefrom a step wave voltage having a plurality of steps or risers corresponding in number to the number of recurring input pulses in each cycle of operation.

3. A pulse counting system comprising a vacuum tube having a grid, anode and cathode electrodes, a pulse transformer having a primary winding coupled to a source of recurring pulses of short duration compared to the time intervals between them and of substantially constant frequency, a connection from one terminal of the secondary winding of said pulse transformer to said grid, a connection including the parallel combination of a resistor and a condenser connecting the other terminal of said secondary winding and said cathode, said parallel combination having a long time constant in comparison to the interval between said pulses and providing a fixed bias which normally causes said tube to be non-conductive, the pulses applied to said grid being of positive polarity and having sufficient magnitude to cause said tube to conduct for substantially the duration of each pulse, and a storage condenser connecting said last terminal of said secondary winding to ground, whereby an incremental increase in voltage is developed across said storage condenser for each recurring input pulse during a cycle of operation of said system, and a regeneratively coupled normally non-conductive pulse oscillator coupled to said storage condenser and responsive to a predetermined value of voltage built up on said condenser for producing a pulse and substantially simultaneously therewith discharging said condenser to a low value of voltage, said pulse oscillator having a self-regulating bias arrangement in circuit with the cathode thereof, and an output circuit coupled to said pulse oscillator for deriving therefrom a pulse each time said oscillator conducts.

4. A pulse counting system comprising a vacuum tube having grid, anode and cathode electrodes, a pulse transformer having a primary winding coupled to a source of recurring pulses of short duration compared to the time intervals between them and of substantially constant frequency, a connection from one terminal of the secondary winding of said pulse transformer to said grid, a connection including the parallel combination of a resistor and a condenser connecting the other terminal of said secondary winding and said cathode, said parallel combination having a long time constant in comparison to the interval between said pulses and providing a fixed bias which normally causes said tube to be non-conductive, the pulses applied to said grid being of positive polarity and having sufficient magnitude to cause said tube to conduct for substantially the duration of each pulse, and a storage condenser connecting said last terminal of said secondary winding to ground, whereby an incremental increase in voltage is developed across said storage condenser for each recurring input pulse during a cycle of operation of said system, a normally non-conductive pulse oscillator comprising a pulse transformer and a vacuum tube, said last tube having an anode connected in series with one winding of said last pulse transformer and a cathode connected to ground through the parallel combination of a resistor and a condenser, said one winding of said last pulse transformer being connected to said storage condenser, whereby said pulse oscillator conducts when the voltage on said storage condenser builds up to a predetermined value and thereupon discharges said storage condenser to a low value of voltage, said parallel combination of resistor and condenser constituting a self-regulating bias arrangement.

5. A pulse counting system comprising a vacuum tube having grid, anode and cathode electrodes, a pulse transformer having a primary winding coupled to a source of recurring pulses of short duration compared to the time intervals between them and of substantially constant frequency, a connection from one terminal of the secondary winding of said pulse transformer to said grid, a connection including the parallel combination of a resistor and a condenser connecting the other terminal of said secondary winding and said cathode, said parallel combination having a long time constant in comparison to the interval between said pulses and providing a fixed bias which normally causes said tube to be non-conductive, the pulses applied to said grid being of positive polarity and having sufficient magnitude to cause said tube to conduct for substantially the duration of each pulse, and a storage condenser connecting said last terminal of said secondary winding to ground, whereby an incremental increase in voltage is developed across said storage condenser for each recurring input pulse during a cycle of operation of said system, a normally non-conductive pulse oscillator comprising a pulse transformer and a vacuum tube, said last tube having an anode connected in series with one winding of said last pulse transformer and a cathode connected to ground through the parallel combination of a resistor and condenser, said one winding of said last pulse transformer being connected to said storage condenser, whereby said pulse oscillator conducts when the voltage on said storage condenser builds up to a predetermined value and thereupon discharges said storage condenser to a low value of voltage, another winding of said last pulse transformer being regeneratively coupled to the grid of said oscillator tube, the time constant of said parallel combination of resistor and condenser in the cathode circuit of the oscillator tube being long compared to the time between discharges of said storage condenser, and an output circuit coupled to said pulse oscillator.

6. A pulse counting system comprising a vacuum tube having grid, anode and cathode electrodes, a pulse transformer having a primary winding coupled to a source of recurring pulses of short duration compared to the time intervals between them and of substantially constant frequency, a connection from one terminal of the secondary winding of said pulse transformer to said grid, a connection including the parallel combination of a resistor and a condenser connecting the other terminal of said secondary winding and said cathode, said parallel combination having a long time constant in comparison to the interval between said pulses and providing a fixed bias which normally causes said tube to be nonconductive, the pulses applied to said grid being of positive polarity and having sufficient magnitude to cause said tube to conduct for substantially the duration of each pulse, and a storage condenser connecting said last terminal of said secondary winding to ground, whereby an incremental increase in voltage is developed across said storage condenser for each recurring input pulse during a cycle of operation of said system, a space discharge path across said storage condenser, and means including a regeneratively coupled pulse oscillator responsive to a predetermined voltage on said storage condenser for rendering said space discharge path conductive to thereby discharge said storage condenser to a lower value of voltage than the value of said predetermined voltage.

7. A pulse counting system comprising a vacuum tube having grid, anode and cathode electrodes, a pulse transformer having a primary winding coupled to a source of recurring pulses of short duration compared to the time intervals between them and of substantially constant frequency, a connection from one terminal of the secondary winding of said pulse transformer to said grid, a connection including the parallel combination of a resistor and a condenser connecting the other terminal of said secondary winding and said cathode, said parallel combination having a long time constant in comparison to the interval between said pulses and providing a fixed bias which normally causes said tube to be non-conductive, the pulses applied to said grid being of positive polarity and having sufficient magnitude to cause said tube to conduct for substantially the duration of each pulse, and a storage condenser connecting said last terminal of said secondary winding to ground, whereby an incremental increase in voltage is developed across said storage condenser for each recurring input pulse during a cycle of operation of said system, a space discharge path across said storage condenser, and means including a normally non-conductive electron discharge device operative after a predetermined plurality of said recurring pulses for rendering said space discharge path conductive to thereby discharge said storage condenser to a lower voltage value than that built up during a cycle of operation of said system.

8. A pulse counting system comprising a vacuum tube having grid, anode and cathode electrodes, a pulse transformer having a primary winding coupled to a source of recurring pulses of short duration compared to the time intervals between them and of substantially constant frequency, a connection from one terminal of the secondary winding of said pulse transformer to said grid, a connection including the parallel combination of a resistor and a condenser connecting the other terminal of said secondary winding and said cathode, said parallel combination having a long time constant in comparison to the interval between said pulses and providing a fixed bias which normally causes said tube to be non-conductive, the pulses applied to said grid being of positive polarity and having sufficient magnitude to cause said tube to conduct for substantially the duration of each pulse, and a storage condenser connecting said last terminal of said secondary winding to ground, whereby an incremental increase in voltage is developed across said storage condenser for each recurring input pulse during a cycle of operation of said system, a cathode follower tube having a grid connected to said storage condenser and a cathode connected to ground through a resistor, a load circuit connected to said last resistor, a space discharge path across said storage condenser, and means including a normally non-conductive electron discharge device operative in response to applied synchronizing pulses for rendering said space discharge path conductive to thereby discharge said storage condenser to a lower voltage value than that built up during a cycle of operation of said system.

9. A pulse counting system comprising a vacuum tube having grid, anode and cathode electrodes, a pulse transformer having a primary winding coupled to a source of recurring pulses of short duration compared to the time intervals between them and of substantially constant frequency, a connection from one terminal of the secondary winding of said pulse transformer to said grid, a connection including the parallel combination of a resistor and a condenser connecting the other terminal of said secondary winding and said cathode, said parallel combination having a long time constant in comparison to the interval between said pulses and providing a fixed bias which normally causes said tube to be non-conductive, the pulses applied to said grid being of positive polarity and having sufficient magnitude to cause said tube to conduct for substantially the duration of each pulse, and a storage condenser connecting said last terminal of said secondary winding to ground, whereby an incremental increase in voltage is developed across said storage condenser for each recurring input pulse during a cycle of operation of said system, a cathode follower tube having a grid connected to said storage condenser and a cathode connected to ground through a resistor, a load circuit connected to said last resistor, a space discharge path across said storage condenser, another space discharge path across said last resistor, and means including a normally non-conductive electron discharge device operative in response to applied synchronizing pulses of predetermined recurrence rate for rendering both of said space discharge paths conductive.

10. In a pulse counter circuit, a cathode follower tube having a cathode resistor, an output circuit coupled to said cathode resistor, a space discharge path coupled across said resistor, and means responsive to a synchronizing voltage wave for rendering said space discharge path conductive.

11. A pulse counting system comprising a vacuum tube having grid, anode and cathode electrodes, a pulse transformer having a primary winding coupled to a source of recurring pulses of short duration compared to the time intervals between them and of substantially constant frequency, a connection from one terminal of the secondary winding of said pulse transformer to said grid, a connection including the parallel combination of a variable resistor and a condenser connecting the other terminal of said secondary winding and said cathode, said parallel combination having a long time constant in comparison to the interval between said pulses and providing a fixed bias which normally causes said tube to be non-conductive, the pulses applied to said grid being of positive polarity and having sufficient magnitude to cause said tube to conduct for substantially the duration of each pulse, and a storage condenser connecting said last terminal of said secondary winding to ground, whereby an incremental increase in voltage is developed across said storage condenser for each recurring input pulse during a cycle of operation of said system, a space discharge path across said storage condenser, and means including a regeneratively coupled pulse oscillator responsive to a predetermined voltage on said storage condenser for rendering said space discharge path conductive to thereby discharge said storage condenser to a lower value of voltage than the value of said predetermined voltage, said pulse oscillator including a three-winding pulse transformer, and an output circuit coupled to one winding of said last pulse transformer.

12. A pulse counting system comprising a vacuum tube having grid, anode and cathode electrodes, a source of anode polarizing potential connected to said anode, means for normally biasing said tube to the anode current cut-off condition, an input circuit coupled to said grid and cathode for supplying short duration pulses of such polarity and magnitude as to cause said tube to conduct for a time equal at most to the duration of each applied pulse, said means including a resistance-parallel connected condenser in the cathode circuit of said tube, said resistance-condenser arrangement having a time constant which is large in comparison with the average interval between adjacent input pulses, a charge collecting condenser connected between ground and said resistance-condenser arrangement, whereby an incremental increase in voltage of positive polarity is built up on said charge collecting condenser for each input pulse during a cycle of operation, means responsive to a predetermined synchronizing voltage of prearranged recurrence rate for discharging said condenser, a cathode follower tube having a grid and a cathode, a resistor connected in the cathode circuit of said cathode follower tube, a connection between the grid of said follower tube and the cathode of said normally cut-off vacuum tube, and an output circuit coupled to the cathode of said cathode follower for deriving therefrom a step wave voltage having a plurality of risers of different voltage values relative to ground.

13. A pulse counting system comprising a vacuum tube having grid, anode and cathode electrodes, a source of anode polarizing potential connected to said anode, means for normally biasing said tube to the anode current cut-off condition, an input circuit coupled to said grid and cathode for supplying short duration pulses of such polarity and magnitude as to cause said tube to conduct for a time equal at most to the duration of each applied pulse, said means including a resistance-parallel connected condenser in the cathode circuit of said tube, said resistance-condenser arrangement having a time constant which is large in comparison with the average interval between adjacent input pulses, a charge collecting condenser connected between ground and said resistance-condenser arrangement, whereby an incremental increase in voltage of positive polarity is built up on said charge collecting condenser for each input pulse during a cycle of operation, means responsive to a predetermined synchronizing wave for discharging said condenser, a cathode follower tube having a grid and a cathode, a resistor connected in the cathode circuit of said cathode follower tube, a connection between the grid of said follower tube and the cathode of said normally cut-off vacuum tube, and an output circuit coupled to the cathode of said cathode follower for deriving therefrom a step wave voltage having a plurality of risers of different voltage values relative to ground, a space path connected across said cathode resistor of said follower tube, and means for causing current to flow in said space path to thereby provide a low impedance path across said last cathode resistor substantially simultaneously with the discharge of said charge collecting condenser.

14. In a pulse counter circuit, a charge collecting condenser, means including an electronic circuit for applying incremental charges to said condenser in response to a corresponding number of applied pulses, a cathode follower tube having a grid connected to one plate of said condenser and a cathode connected through a resistor to the other plate of said condenser, and an output lead connected to the cathode of said follower tube for deriving a step wave voltage from said counter circuit, a space discharge path across said resistor, and an electric tube circuit responsive to a predetermined synchronizing voltage wave for rendering said space discharge path conductive and for discharging said condenser.

15. A pulse counting system comprising a vacuum tube having grid, anode and cathode electrodes, a pulse transformer having a primary winding coupled to a source of recurring pulses of short duration compared to the time intervals between them and of substantially constant frequency, a connection from one terminal of the secondary winding of said pulse transformer to said grid, a connection including the parallel combination of a resistor and a condenser connecting the other terminal of said secondary winding and said cathode, said parallel combination having a long time constant in comparison to the interval between said pulses and providing a fixed bias which normally causes said tube to be nonconductive, the pulses applied to said grid being of positive polarity and having sufficient magnitude to cause said tube to conduct for substantially the duration of each pulse, and a storage condenser connecting said last terminal of said secondary winding to ground, whereby an incremental increase in voltage is developed across said storage condenser for each recurring input pulse during a cycle of operation of said system, a normally non-conductive pulse oscillator comprising a three-winding pulse transformer and a vacuum tube, said last tube having an anode connected in series with one winding of said last pulse transformer and a cathode connected to ground through the parallel combination of a resistor and condenser, said one winding of said last pulse transformer being connected to said storage condenser, whereby said pulse oscillator conducts when the voltage on said storage condenser builds up to a predetermined value and thereupon discharges said storage condenser to a low value of voltage, the time constant of said parallel combination of resistor and condenser in the cathode circuit of the oscillator tube being long compared to the time between discharges of said storage condenser, means regeneratively coupling the second winding of said last pulse transformer to the grid of said oscillator tube, and an output circuit coupled to the third winding of said pulse oscillator.

BERTRAM TREVOR.

REFERENCES CITED

The following references are of record in the file of this patent:

UNITED STATES PATENTS

| Number | Name | Date |
|---|---|---|
| 2,078,792 | FitzGerald | Apr. 27, 1932 |
| 2,221,452 | Lewis | Nov. 12, 1940 |
| 2,235,131 | Wheeler | Mar. 18, 1941 |
| 2,275,460 | Page | Mar. 10, 1942 |
| 2,392,632 | Berry | Jan. 8, 1946 |
| 2,474,040 | Day | June 21, 1949 |

FOREIGN PATENTS

| Number | Country | Date |
|---|---|---|
| 487,982 | Great Britain | July 29, 1938 |